No. 802,941. PATENTED OCT. 24, 1905.
A. J. ROSSI.
PROCESS FOR THE REDUCTION OF METALLIC OXIDS AND THE SEPARATION
OF THE RESULTING METALS.
APPLICATION FILED NOV. 3, 1902.
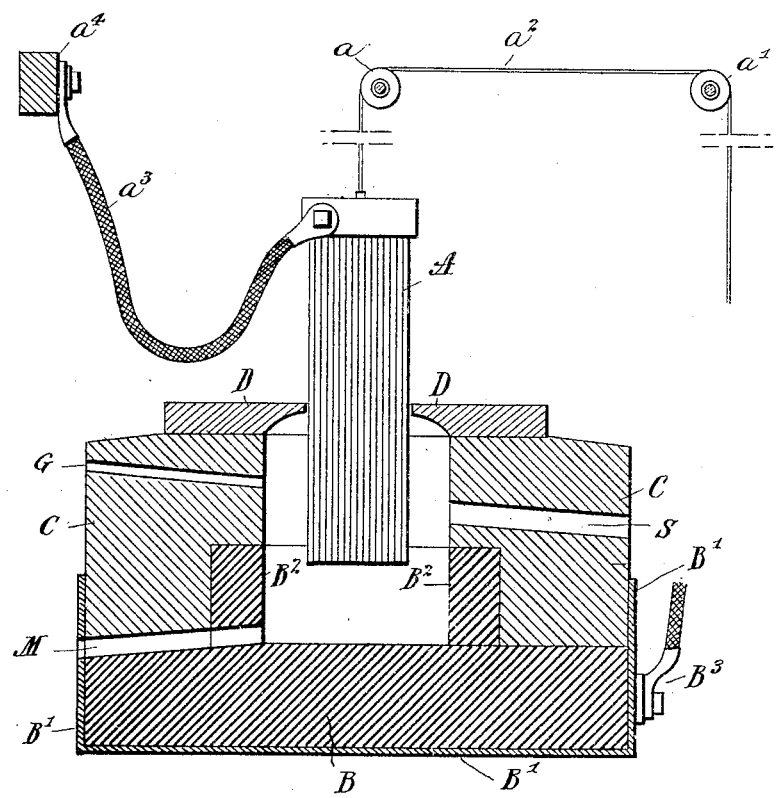

UNITED STATES PATENT OFFICE.

AUGUSTE J. ROSSI, OF NEW YORK, N. Y., ASSIGNOR, BY DIRECT AND MESNE ASSIGNMENTS, OF FORTY-TWO AND ONE-HALF ONE-HUNDREDTHS TO JAMES MacNAUGHTON, OF TAHAWUS, NEW YORK, AND FIFTEEN ONE-HUNDREDTHS TO PHILIP C. PECK, OF NEW YORK, N. Y.

PROCESS FOR THE REDUCTION OF METALLIC OXIDS AND THE SEPARATION OF THE RESULTING METALS.

No. 802,941. Specification of Letters Patent. Patented Oct. 24, 1905.

Application filed November 3, 1902. Serial No. 129,992.

*To all whom it may concern:*

Be it known that I, AUGUSTE J. ROSSI, a citizen of the United States, and a resident of the borough of Manhattan, city, county, and State of New York, have invented a certain new and useful Process for the Reduction of Metallic Oxids and the Separation of the Resulting Metals from Foreign Matter Previously Associated Therewith, of which the following is a specification.

The object of my invention is to produce a more economical, controllable, and effective process for the purpose specified and one which shall be especially adapted to the successful and economical reduction, on an industrial scale, of the more refractory oxids, and particularly such oxids and others which are in their natural state associated with foreign elements, substances, or compounds tending to impair the purity of the resulting metallic product.

My present invention depends in a measure upon the fact that the heat of a given metal's combination with oxygen varies at different temperatures, diminishing generally as the latter rises, and that while the heats of such combination or formation in the case of two given metals may be identical at a certain very high temperature such heats vary absolutely and particularly relatively to each other as the temperatures vary, so that at lower temperatures said heat of oxid formation of the one metal used in my process as the reducing agent may be enormously greater than the corresponding heat at the same temperature of a similarly-used metal or substance—as, for instance, assuming that the temperatures of oxid formation of carbon and aluminium per one atomic weight of oxygen are substantially identical at the temperature of 2,000° centigrade, or thereabout, at the reduced temperature of, say, 500° centigrade the heat of formation of alumina is substantially one hundred and thirty thousand calories and that of carbon only twenty-eight thousand calories, while at temperatures above two thousand degrees the heat of formation of carbon monoxid becomes greater than that of alumina and carbon begins to decompose alumina. From this it follows that certain metals may be employed with greater advantage under conditions hereinafter described as reducing agents even for such a refractory oxid as that of titanium, for instance, and my experiments and tests have demonstrated such to be the fact.

I am aware that aluminium is a very powful reducing agent and has, prior to my present invention, been to a limited extent utilized as such under conditions involving preliminary treatment of the ingredients of the charge, as well as the presence of other reagents supposed to contribute to the effecting of the required reactions—as, for instance, aluminium preliminarily finely powdered has been intimately mixed with the metallic oxid to be reduced after the latter has been likewise finely powdered, whereupon under ordinary temperature one point of the mixture has been raised by means of a primer of aluminium and a very easily reduced oxid, likewise mixed together in powdered state, to a temperature sufficiently high to commence the desired reaction, whereupon the latter is then continued exothermally until complete—that is, without the assistance of any external heat; but the expense of the aforesaid indispensable preliminary preparation of the aluminium and the oxid has proved too costly for the general and economical industrial utilization of such process, at least in many fields, and, moreover, the comparatively brief duration of the great heat produced by the combination of the oxygen of the oxid with the reducing metal has proved inadequate to produce the desired reaction in all parts of the charge, the comprehensiveness thereof being dependent upon and proportional to the mechanically-produced fineness of the particles and the uniformity and thoroughness of their admixture with each other, in consequence of which it has proved uncertain and difficult, if not impossible, to produce by such process a resulting metal or metals free from uncombined remnants of the reducing metal as well as other undesirable impurities. In other instances where the object sought was the production of an alloy of aluminium with the metal of a refractory oxid or an alloy of such last-named metal with other metals molten aluminium has been employed, but always in conjunction with a preliminary or cotemporaneous treatment of the refractory oxid by a bath of other constituents supposed to contribute essentially not only to the resulting product, but also directly to the reduction of the oxid. Such processes, however, have not only proved too costly for general utilization on an industrial scale, but also have failed to produce by a single heat a pure monometallic resultant. In another case the process has depended upon preliminary reduction of the oxid treated to a very finely powdered state, which is in dry condition charged into a crucible above a coil of aluminium wire, which latter is melted by passing therethrough a current of electricity, and the temperature thus sufficiently raised to set up at that point the required reaction which afterward extends to the entire charge of said oxid and aluminium contained in the crucible and previously introduced therein likewise in a dry state.

My present invention therefore consists in the practical application of the discovery, due to my researches and experiments, that a reducing agent possessing the qualities and sustaining the thermal relation to the refractory oxid herein pointed out may best be utilized in its molten or liquid form and by itself alone as a bath preliminarily prepared for subsequent introduction therein of the oxid and provided thereafter the requisite continuous support and high temperature are afforded to the charge, whereby all previous or other mechanical, chemical, or thermal treatment of the oxid, of the reducing agent, or of the charge is beneficially dispensed with and a completely finished, merchantable, monometallic product secured in one heat free from impurities and undesired elements of the charge.

To further illustrate, my invention may be carried out as follows, viz: As the first step of my process I provide in any convenient way for immersion thereinto of the oxygenated metal and its accessories, such as gangue of ore, &c., a bath consisting of a liquefied metal, (preferably aluminium,) the heat of the formation of the oxid of which is at a certain high temperature, presumably greater than that of the formation of the oxid of the said oxygenated metal—that is to say, in a crucible or other convenient supporting vessel I first prepare a bath of molten aluminium by utilizing for that purpose in any convenient manner temperatures sufficient to reduce the aluminium to and retain it in a molten state. I next immerse into said bath such proportion of the oxygenated metal as will approximately afford under the treatment following sufficient oxygen to combine with the aluminium, and it will be observed that the ingredients thus entering into the bath are introduced therein not necessarily in a powdered condition, but merely in their natural condition or such coarse subdivision as will tend to accelerate their reduction to the required state. After this I keep the temperature of the bath so constituted raised to a point sufficiently high to insure the commencement and continuance of the reaction by which the refractory oxygenated metal parts with its oxygen and the latter combines with the aluminium to form alumina. The intense heat resulting from the said reaction supplements uninjuriously the temperature already previously secured, and, in fact, this exothermal excess of heat would during its continuance permit of the reduction of the temperature first applied to the charge as aforesaid were such reduction of any economical importance; but it will be observed that as the exothermal heat of the reaction diminishes I take pains to supply from the original external source such continuance or addition of heat as to maintain the ingredients of the charge at the temperature requisite to insure fluidity and the full accomplishment of the aforesaid reaction among such particles of the charge as may have failed to become requisitely associated during the comparatively brief duration of the exothermal heat arising from the said reaction taking place in the major portion of the charge.

The result of my aforesaid improved process and treatment of the ingredients of the charge is as follows: As the oxygenated compound becomes reduced its molten metallic constituents become separated and segregated at the bottom of the charge, while the liberated oxygen is simultaneously taken up by the aluminium, producing an alumina slag which either floats upon the surface of the bath and can be thus separated and withdrawn by any of those numerous methods which will be obvious to those skilled in the art or readily separated after cooling the charge. Other impurities in the charge, whether derived from the materials of the vessel in which the operation is carried on or from the gangues of the oxygenated metal, or both, will on the sufficient continuance of the high temperature required enter into and become constituents of the said slag, into which, on the one hand, will become incorporated substantially all impurities in the charge, leaving, on the other hand, in the nether portion of the bath a substantially pure segregation of the desired metal. As regards temperature, the requirements are the application of an external initial heat sufficiently high not only to liquefy the aluminium, but also to set up the aforesaid reaction and insure its continuance until completed. While the exothermic action is occurring, and consequently high temperatures generated thereby, the amount of external heat may, if desired, be diminished; but toward the termination of the exothermic action the heat derived from an external source should be again timely raised to such a temperature as to insure the continued fluidity of the charge, and thus the that in any case the oxid to be reduced may be introduced into the bath gradually in successive charges instead of all at once.

My preference for performing my process by the aid of heat derived from an electrical source is not to be taken as excluding other heating means when admissible. In many cases I find that for certain metals the high temperatures of an electric furnace are not required; but that those of an open-hearth furnace or any other similar metallurgical contrivance by means of which sufficiently-high temperatures can be produced will prove sufficient, the only limitation being that the source of heat shall be of such a character and capacity as to secure the reducing action of aluminium on the metallic oxid and to maintain the charge in a molten condition after the reduction of the oxids by the aluminium and long enough to insure the separation of ingredients of the charge above described and the resulting purification of the metallic product. In all cases of the application of my said process and whatever may be the metallic oxid reduced the aluminium oxidized into alumina at the expense of the oxygen of such oxids forms, as I have stated, a slag which is readily separated from the metal underneath it when cooled or which can be tapped out of the furnace, if desired. This melted alumina, as a sort of artificial corundum, forms an excellent abrasive material somewhat akin to natural corundum, which is impure alumina, and this by-product is valuable for use as such abrasive material, or it may be treated as bauxite is in order to remove such impurities as may be associated with it as resultant slag from my process, impurities derived from the gangues of the metallic oxids used, and thus practically pure alumina produced ready to be reduced to aluminium again by well-understood processes.

In United States Letters Patent No. 648,439, granted to me on the 1st day of May, 1900, I claimed a process for producing an alloy of iron and titanium in which was used a bath of molten aluminium, but one step of which consisted in the addition to or the creation in said bath of molten iron. In Letters Patent No. 700,244, granted to me May 20, 1902, I claimed a process for producing alloys of metals assembled in metallic state with metals in oxygenated state involving likewise as one step thereof the use of a bath of molten aluminium, and I do not wish to be understood as claiming in my present application either of the specific processes secured to me by my said previous patents nor the use of the process now claimed so far as any part thereof or principle therein involved may be applicable to or utilized in said processes of said previous patents, my present invention comprising the discovery that a multimetallic bath is not essential to the successful reduction of the oxygenated metal and that the principle of reduction described is completely available for the creation of a monometallic product as well as of an alloy. Neither do I wish to be understood as claiming any of the previous processes to which I have made general reference in the foregoing specification nor any part of such processes, my present invention being distinguishable therefrom in the particular, among others, that I first prepare as a preliminary step in my process a bath of molten reducing metal entirely isolated from the oxid of the metal to be deoxygenated, into which thereafter the oxid of said last-mentioned metal is introduced, with the result that danger of explosion is avoided, reduction more completely effected, and a superior resulting product secured by reason of the fact that during reduction all parts of the oxids undergoing deoxidation are submerged in and surrounded by the liquid reducing metal.

What I claim as new, and desire to secure by Letters Patent, is—

1. The process of reducing metal in oxygenated state which consists firstly, as a separate and preliminary step, in producing, and supporting, isolated from said metal a bath consisting of molten reducing metal the heat of the formation of whose oxid is, at a given temperature, greater than that of the said oxygenated metal, secondly in thereafter immersing into said bath so supported said metal in oxygenated state, thirdly in maintaining in the said charge so supported a temperature sufficiently high to insure the requisite reaction between said reducing metal and the oxygen of the oxygenated metal, and finally in continuing said support and said temperature until the metallic constituents of said oxygenated metal are segregated and separated from the remaining constituents of said mixture, substantially as and for the purposes described.

2. The process of reducing metal in oxygenated state which consists firstly, as a preliminary step, in producing and supporting a bath consisting of molten aluminium, isolated from said metal, secondly in thereafter immersing into said bath so supported, said metal in oxygenated state, thirdly in maintaining in the said charge so supported a temperature sufficiently high to insure the requisite reaction between said aluminium and the oxygen of the oxygenated metal, and finally in continuing said support and said temperature until the metallic constituents of said oxygenated metal are separated from the remaining constituents of said mixture, substantially as and for the purposes described.

3. The process of reducing metal in oxygenated state which consists firstly, as a separate and preliminary step, in producing and supporting, isolated from said metal, a bath consisting of molten reducing metal the heat of extension of the reaction to all particles capable of participating therein. Such being the requirements of temperature in the use of my process, I find it preferable to derive the required heat through the instrumentality of an electric furnace or other application of high electrically-derived temperatures, since such means of heating are more readily controlled during the various stages of my process than any other with which I am acquainted. A convenient manner of utilizing in the application of my process such electrically-derived heat consists in supporting the ingredients of the charge in any approved form of electrical furnace—as, for instance, such as is shown in the accompanying drawing—comprising a vertical central sectional view of the furnace proper and its connections and a view in elevation of the movable electrode and its connections.

Referring to said sectional view of the furnace, B represents the base constructed of material possessing electrical conductivity, preferably graphite, and constituting the floor of the hearth or crucible. $B^2 B^2$ is a vertical lining or wall of similar material, the said floor and wall combining to make up a crucible possessing electrical conductivity. Said crucible is inclosed by a supporting-wall C C of any material sufficiently refractory to withstand the high temperature developed and having no electrical conductivity.

D D represent a cover which may or may not be utilized, according to the special requirement of each case of the application of my said process.

M and S are tap-holes, respectively, for the molten metal and for the slag, which are plugged and unplugged according to requirement, as is well understood by those skilled in the practice of the art.

G is a gas-vent adapted to secure, when required, the requisite escape of gases generated during the application of the process.

B' is a metallic casing with which is connected, in any convenient manner, the negative electrode $B^3$, thus constituting the said crucible the cathode of the electrical circuit.

A is an electrode composed, preferably, of carbon and connected with the positive pole of the circuit through the flexible conductor $a^3$, attached to the bus-bar $a^4$, (shown in section,) which, it will be understood, is supported by any suitable means. The anode A is supported in any convenient manner and so as to provide for its movement vertically, as may be required—as, for instance, supported by the cord $a^2$, passing over the pulleys $a\ a'$, the said cord and its supports being insulated or constructed of non-conducting material.

The furnace is operated as follows: The metal-tap M being plugged, the charge of aluminium, for instance, is introduced into the crucible in any convenient manner—as, for instance, through the aperture in the cover D when the anode A is lifted out of the aperture. The anode A is then moved downward again through said aperture until it attains the requisite proximity to the aluminium. The current is then turned on and the temperature raised sufficiently to liquefy the aluminium. The metallic oxid is next introduced into the molten aluminium and the current increased, if required, so as to raise the temperature of the charge to the point at which the reaction commences. As the exothermal heat develops the current may or may not be turned off, as preferred, but should at all times be so regulated as to insure, until the termination of my process, the continuous high temperature requisite and herein described. It will be understood that I do not confine myself to the particular form of furnace shown in the drawing. It will also be understood that the cover D is not in all cases essential. After the desired reactions have been accomplished the current is discontinued, the slag withdrawn through the slag-tap S and the molten metal through the metal-tap M, the latter having been unplugged. The slag also may be drawn through the metal-tap M, if desired, as will be understood by those skilled in the art. The amount of heat required is merely such as to insure the liquefaction of the metallic constituents of the charge and the raising of the bath of aluminium to and its maintenance at a sufficiently high temperature to reach the point of the heat of formation of alumina as a maximum, which is supposed to be in the vicinity of 2,000° centigrade or thereabout.

The relative proportions of the ingredients of the charge cannot be stated by any hard and fast rule, but will depend in each instance upon the varying qualities of the ingredients. The intensity of the external heat to be supplied during the operation of the deoxidizing phase of my process will depend in all cases on the more or less refractory character of the metallic oxid intended to be reduced, and experiment and practice alone can teach in each case which form and amount of heat is the most convenient or best adapted therefor. As a general rule, it may be stated that the oxygenated metal or metals should be supplied in such proportion relative to the aluminium of the bath as to insure the complete combination of all aluminium and oxygen in the charge. Experiment will be required in each case of varying materials to determine in advance this proportion; but one of the advantages of my process consists in the facility with which any residuum of aluminium remaining in the reduced metal after the completion of the reaction may be refined out of the metallic product merely by the addition of the same metallic oxids, while the temperature and molten condition of the charge is maintained, and it will be observed the formation of whose oxid is, at a given temperature, greater than that of the said oxygenated metal, and which bath shall contain neither molten iron nor any other molten metal assembled in the metallic state, secondly in thereafter immersing into said bath so supported said metal in the oxygenated state, thirdly in maintaining in said charge so supported a temperature sufficiently high to insure the requisite reaction between said reducing metal and the oxygen of the oxygenated metal, and finally in continuing said support and said temperature until the metallic constituents of said oxygenated metal are separated from the remaining constituents of said mixture, substantially as and for the purposes described.

4. The process of reducing metal in oxygenated state which consists firstly, as a preliminary step, in producing and supporting a bath consisting of aluminium isolated from said metal and which bath shall contain neither molten iron nor any other molten metal assembled in the metallic state, secondly in thereafter immersing into said bath so supported, said metal in the oxygenated state, thirdly maintaining in the said charge so supported a temperature sufficiently high to insure the requisite reaction between said aluminium and the oxygen of the oxygenated metal, and finally in continuing said support and said temperature until the metallic constituents of said oxygenated metal are separated from the remaining constituents of said mixture, substantially as and for the purposes described.

AUGUSTE J. ROSSI.

Witnesses:
PHILIP C. PECK,
G. G. MEASURES.